(12) United States Patent  
Sacks et al.

(10) Patent No.: US 8,909,707 B2  
(45) Date of Patent: Dec. 9, 2014

(54) METHOD OF VIRALLY EXPANDING SOCIAL NETWORKS

(75) Inventors: David Oliver Sacks, San Francisco, CA (US); Adam Marc Pisoni, San Francisco, CA (US)

(73) Assignee: Yammer, Inc., San Francisco, CA (US)

( * ) Notice: Subject to any disclaimer, the term of this patent is extended or adjusted under 35 U.S.C. 154(b) by 0 days.

(21) Appl. No.: 13/430,536

(22) Filed: Mar. 26, 2012

(65) Prior Publication Data

US 2013/0024513 A1    Jan. 24, 2013

Related U.S. Application Data

(60) Provisional application No. 61/467,311, filed on Mar. 24, 2011.

(51) Int. Cl.
*G06F 15/16* (2006.01)
*G06Q 10/10* (2012.01)
*G06Q 50/00* (2012.01)

(52) U.S. Cl.
CPC ............... *G06Q 10/10* (2013.01); *G06Q 50/01* (2013.01)
USPC .......................................................... 709/204

(58) Field of Classification Search
CPC .............................. G06Q 50/01; G06Q 10/10
USPC .......................................................... 709/204
See application file for complete search history.

(56) References Cited

U.S. PATENT DOCUMENTS

2005/0171799 A1\* 8/2005 Hull et al. .......... 705/1
2006/0224675 A1\* 10/2006 Fox et al. .......... 709/206

\* cited by examiner

*Primary Examiner* — Noel Beharry
*Assistant Examiner* — Farhad Ali
(74) *Attorney, Agent, or Firm* — Tom Wong; Jim Ross; Micky Minhas

(57) ABSTRACT

Membership in a social network is virally expanded by suggesting to a user to invite contacts from the user's address book and, in addition, eligible contacts from other address books. Eligible contacts from other address books include those contacts that have e-mail addresses with the same e-mail domain as the user's e-mail address.

18 Claims, 5 Drawing Sheets

METHOD OF VIRALLY EXPANDING SOCIAL NETWORKS

CROSS-REFERENCE TO RELATED APPLICATIONS

This application claims priority benefit to U.S. provisional patent application titled, "METHOD OF VIRALLY EXPANDING SOCIAL NETWORKS" filed on Mar. 24, 2011, having application Ser. No. 61/467,311, and is incorporated by reference herein.

BACKGROUND

Micro-blogging has become an effective means for collaborative discussion by allowing participants to share information at any given moment on a topic. In the Yammer® micro-blogging service, each participant is included in a social network that is associated with the domain portion of their email address. For example, if Joe (joe@foo.com) and Bob (bob@foo.com) register with Yammer®, then both are automatically included in the foo.com social network. Further, if Mike (mike@loo.com) and Greg (greg@loo.com) register with Yammer®, then both are automatically included in the loo.com social network.

Increasing the number of individuals who are members of social networks in the micro-blogging service of Yammer® is desirable. In fact, social networks in general strive to increase the number of users since a large number of users enhances the comprehensiveness and relevance of the information shared by the users in the social networks. There is also a certain critical mass that needs to be achieved to make any social network useful. In particular, the frequency at which a user is likely to participate in a social network corresponds significantly to the amount of information that is presently available in the social network and the number of users that are participating in the social network.

Presently, several techniques are used to promote users of a social network to invite their colleagues, friends, and/or family to join. In one such technique, contacts included in the address book of users of the social network are invited to join the social network. These invitations are automatically generated from a user's address book when the user registers with a social network. However, such invitations are often viewed by recipients as spam due to the increased frequency at which they are being generated. As a result, the invitations are mostly ignored and fail to provide any substantial growth to the social network.

SUMMARY

One or more embodiments of the present invention provide a method of virally expanding membership in a social network. In one embodiment, each user, when signing up to a social network, selects a subset of his or her contacts to invite to the social network. Contact information of those not selected is stored for subsequent analysis. The subsequent analysis includes determining which of the unselected contacts are eligible for inclusion in pre-existing social networks, e.g., social networks that have been established already with an Internet domain name that is same as the one in the e-mail address of the unselected contacts. Upon such determination, a suggestion is made to users of pre-existing social networks to invite unselected contacts to join their social networks. As a result, the viral expansion of membership in a social network is accelerated.

A computer-implemented method of expanding a user base of an online service that manages a plurality of client social networks, according to an embodiment of the present invention, includes the steps of examining an address book of a first user of the online service and identifying a contact in the address book who is not registered in any of the client social networks, and generating an invitation interface for a second user of the online service who is registered in a client social network that is associated with a domain name that is contained in an e-mail address of the identified contact, wherein the invitation interface displays the identified contact as a person to invite.

A computer-implemented method of expanding a user base of an online service that manages a plurality of client social networks, according to another embodiment of the present invention, includes the steps of examining address books of users of the online service and identifying contacts in the address books who are not registered in any of the client social network, and generating invitation interfaces by which users of the online service can invite the identified contacts to join the client social networks to which the users belong. The invitation interfaces include a first invitation interface by which a first user of the online service can invite a first one of the identified contacts and a second invitation interface by which a second user of the online service can invite a second one of the identified contacts, and the address book of the first user does not contain contact information of the first one of the identified contacts and the address book of the second user does not contain contact information of the second one of the identified contacts.

A computer-implemented method of expanding a user base of an online service that manages a plurality of client social networks, according to still another embodiment of the present invention, includes the steps of generating an account for a new user in the first client social network, generating a first invitation interface for the new user, sending out invitations according to inputs made by the new user in the first invitation interface, examining address books of existing users of the online service and identifying a contact in the address books who is not registered in any of the client social networks and whose e-mail address domain is the same as that of the new user, and generating a second invitation interface for the new user by which the new user can invite the identified contact.

Further embodiments of the present invention include, without limitation, a non-transitory computer-readable storage medium that includes instructions that enable a processing unit to implement one or more aspects of the above methods.

DETAILED DESCRIPTION

Figure 1:
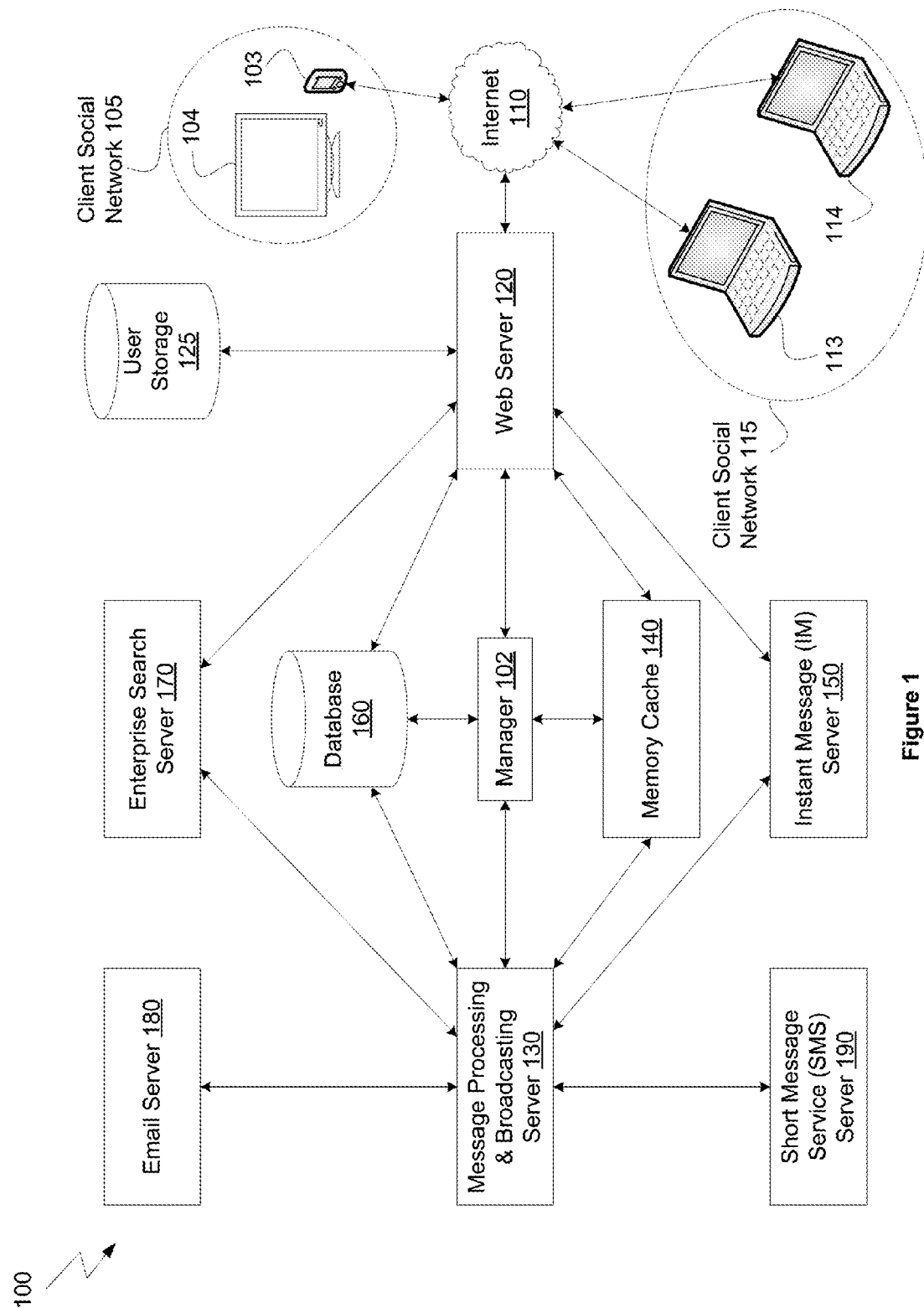
FIG. 1 illustrates an exemplary system for collaborative short messaging and discussion according to one or more embodiments of the present invention.

FIG. 1 illustrates an exemplary system for a micro-blogging system 100, according to one or more embodiments of the present invention. As shown, micro-blogging system 100 includes a manager 102, client devices 103, 104, 113, and 114, web server 120, user storage 125, message processing and broadcasting server 130, memory cache 140, instant message (IM) server 150, database 160, enterprise search server 170, email server 180, and short message service (SMS) server 190.

In the embodiment illustrated, micro-blogging system 100 is an online service that is connected to client devices 103, 104, 113, and 114 over internet 110. Manager 102 is a software module running on a computing device that includes a processor and memory and controls the overall operation of micro-blogging system 100. Alternatively, the connection may be over Wide Area Networks (WANs), Local Area Networks (LANs), or any other system of interconnection enabling two or more devices to exchange information. Client devices 103, 104, 113, and 114 allow access to web server 120 via browsers such as Microsoft Internet explorer, Apple Safari, Mozilla, Firefox or any other browser that supports HTML and JavaScript that may allow network access via the web. Examples of client devices 103, 104, 113, and 114 include personal computers and mobile computing devices.

In the embodiment illustrated in FIG. 1, users of micro-blogging system 100 are depicted as users of client devices 103, 104, 113, and 114. Users of client devices 103, 104 are shown as being registered (i.e., having a user account) within client social network 105 and users of client devices 113, 114 are shown as being registered (i.e., having a user account) within client social network 115. Only two client social networks are shown in FIG. 1 to simplify the description but in practice there may be a large number of client social networks. Attributes of client social networks are managed by manger 102. Client social networks 105, 115 are depicted in dotted circles to indicate the relationship between users of client devices 103, 104 (i.e., they belong to the same client social network 105) and the relationship between users of client devices 113, 114 (i.e., they belong to the same client social network 115).

As is described in detail herein, a client social network is a collection of users and content generated by one or more users. Manger 102 maintains isolation between client social networks so that a user registered in one client social network has the ability to see public information of other users in that client social network—but not any information in a different client social network, unless the user has been specifically granted such access. In one embodiment, each user is registered in a client social network that is associated with the domain portion of the user's email address. For example, in FIG. 1, users of client devices 103, 104 are registered in client social network 105 because they share the same email domain (e.g., joe@foo.com and bob@foo.com). Likewise, users of client devices 113, 114 are registered in client social network 115 because they share the same email domain. Thus, in this example, each client social network is associated with a unique email domain.

Web server 120 is a web server that uses protocols and/or applications including Hypertext transfer Protocol (HTTP), File Transfer Protocol (FTP), Extensible Messaging and Presence Protocol (XMPP), or other similar connection protocols. The operating system may be Windows, LINUX, SUN Solaris, Mac OS, or other similar operating system. Users create an account on web server 120 and are registered in client social networks as described above. Messages are sent from client devices 103, 104, 113 or 114 to web server 120 through internet 110. Messages are received via web server 120, email server 180, and/or SMS server 190.

Message processing and broadcasting server 130 is a server capable of processing the content of messages, operating a message queue, and directing messages to the appropriate resource in micro-blogging system 100. The operating system may be Windows, LINUX, SUN Solaris, Mac OS, or other similar operating system. Message processing and broadcasting server 130 may distribute messages to email server 180, SMS server 190, IM server 150, memory cache 140, database 160, and enterprise search server 170.

Instant message server 150 is a server using any protocols and/or applications for sending instant messages including, but not limited to, Extensible Messaging and Presence Protocol (XMPP), ejabberd, and Bi-Directional-Streams Over HTTP (BOSH). Enterprise search server 170 is a server using any protocol and/or application for enterprise searches such as Apache's Solr. User Storage 125 is a storage drive or other device capable of file storage.

The foregoing describes an exemplary micro-blogging system in which embodiments of the invention may be implemented. It is noted, however, that the techniques described herein are not limited to micro-blogging systems, but may be applied to any system in which address book information may be parsed to identify relationships between the contacts included therein and users belonging to one or more client social networks. Such relationships are used, for example, to provide more substantive recommendations to join a client social network, as described in further detail below.

Figure 2:
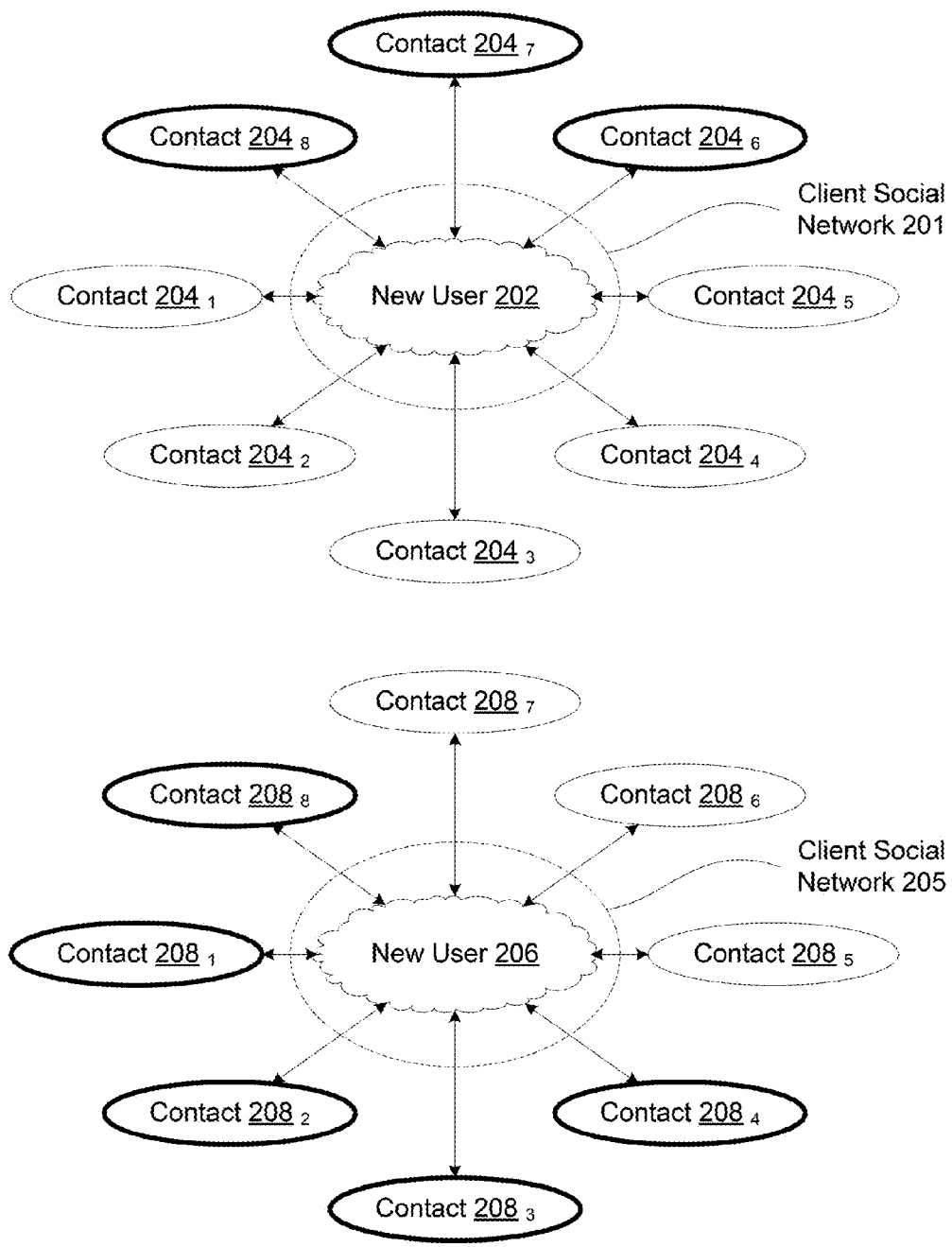
FIG. 2 is a block diagram illustrating two separate and distinct user accounts that are each associated with a different set of contacts.

FIG. 2 is a block diagram illustrating two separate and distinct users who are each associated with a different set of contacts. As shown, a new user 202 is associated with contacts $204_{1-8}$ and a client social network 201, while a new user 206 is associated with contacts $208_{1-8}$ and a client social network 205. After manager 102 generates accounts for user 202 and user 206, manager 102 queries client devices operated by user 202 and user 206 for contacts 204 and contacts 208, respectively, stored therein, or accessible thereby, respectively. In one example, manager 102 transmits a request to, e.g., client device 103, where the request causes an address book stored on or accessible to client device 103 to be displayed to the user thereof, e.g., user 202. Here, user 202 examines his or her address book to select a plurality of contacts who he or she feels would benefit from joining micro-blogging system 100—such as coworkers that should be included in the client social network 201, and/or colleagues that he or she feels would benefit from joining other client social networks or creating their own client social networks. In one embodiment, each contact is associated with a checkbox that indicates whether the contact will be invited by manager 102 to join micro-blogging system 100. As a convenience, a "select-all" and a "select none" checkbox may also be provided, thereby enabling user 202 to easily invite all of his or her contacts.

Notably, it is likely that user 202 will select only a small number of contacts relative to the total number of contacts with whom he or she is associated. For example, if user 202 is joining micro-blogging system 100 to join a client social network associated with the company for which he or she works, it is unlikely that he or she would be inclined to invite, for example, his or her relatives to join micro-blogging system 100. However, assuming that user 202 selects at least one contact to specifically invite to join micro-blogging system 100, it is allowable, based on, for example, a privacy agreement to which user 202 agreed when joining micro-blogging system 100, for manager 102 to extract each and every contact 204 stored within client device 103. FIG. 2 illustrates this technique, where contacts $204_6$, $204_7$, and $204_8$ are specifically selected by user 202 to be invited to join micro-blogging system 100 and are stored into database 160, and where contacts $204_{1-5}$—who are not selected by user 202—are not immediately invited to join micro-blogging system 100, but are nonetheless gathered from the client device 103 and stored into database 160 for later use.

Similarly, with respect to user 206, contacts $208_{1-4}$ and contact $208_8$ are specifically selected by user 204 to be invited to join micro-blogging system 100 and are stored into database 160, and contacts $208_{5-7}$—who are not selected by user 206—are not invited to join micro-blogging system 100, but are nonetheless gathered from the client device of user 206 and stored into database 160 for later use.

Advantageously, contacts 204 and contacts 208 who are specifically selected to be invited to join micro-blogging system 100 will likely join micro-blogging system 100 in view of the relevance of the referral, thereby increasing the overall usage and comprehensiveness of micro-blogging system 100. Moreover, the contacts 204 and the contacts 208 who were not specifically invited to join micro-blogging system 100 remain stored in database 160 for subsequent analysis and utilization, the details of which are described below in conjunction with FIG. 3.

Figure 3:
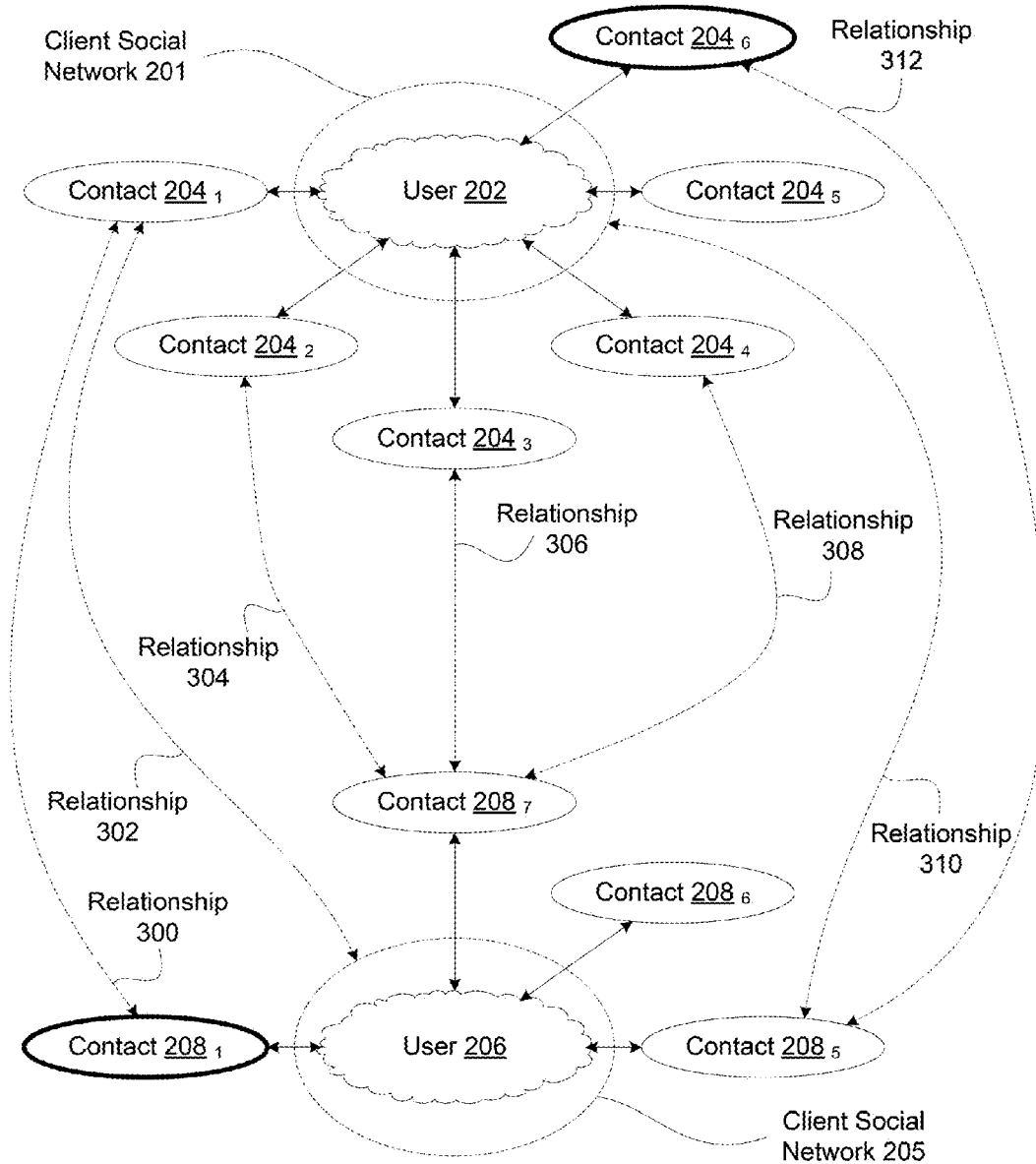
FIG. 3 is a block diagram illustrating implicit relationships between two or more contacts.

FIG. 3 is a block diagram illustrating a technique to identify relationships between users and contacts. As shown, relationships 300-312 exist between user 202, user 206, contacts 204, and contacts 208. Such relationships illustrate the various ways in which both contacts who were not specifically selected to be invited to micro-blogging system 100—along with contacts who were specifically selected to be invited to micro-blogging system 100, but did not respond to the invitation—can be invited to join micro-blogging system 100 in view of relationships 300-312.

To establish relationships 300-312, manager 102 parses database 160 according to a variety of techniques, including matching similar attributes shared between the aforementioned contacts and users. In a first example, relationship 300 is identified, by manager 102, between contact $204_1$ and contact $208_1$. Here, contact $208_1$ represents the contact who was selected by user 206 to be invited to join micro-blogging system 100, but failed to respond to the invitation. Such failure to respond may occur for a number of reasons, the key reason being that the contact $208_1$ simply has no particular reason to join micro-blogging system 100. In order to provide a more concrete basis for $208_1$ to join micro-blogging system 100, manager 102 may, e.g., identify that contact $204_1$ and contact $208_1$ share an email domain associated with a small business, e.g., mikescustombusinesscards.com. Accordingly, manager 102 may then send an invitation to both contact $204_1$ and contact $208_1$ via, e.g., an email message, indicating that they would benefit from creating a client social network based on the mikescustombusinesscards.com domain. Advantageously, this notification is more likely to elicit a response from both contact $204_1$ and contact $208_1$ due to the relevance that is brought to their attention, as opposed to, for example, sending contact $208_1$ a redundant reminder to sign up for micro-blogging system 100. Relationship 312 illustrates a similar example, where manager 102 identifies that contact $204_6$—who also did not respond to invitation to join micro-blogging system 100—is associated with contact $208_5$.

As is also shown in FIG. 3, manager 102 may identify relationships between a user included in a client social network, e.g., user 206, and a contact who should also be included in the client social network, e.g., contact $204_1$. An example of this relationship is illustrated as relationship 302, which manager 102 may identify in response to, for example, determining that the email addresses of user 206 and contact $204_1$ share a domain name of a company for which a client social network is already configured. Relationship 310 illustrates a similar example, where user 202 and contact $208_5$ also, like user 206 and contact $204_1$, share attributes beyond a particular threshold, which suggests that they, like user 206 and contact $204_1$, work for a common employer.

Relationships 304, 306 and 308 represent additional relationships that manager 102 may identify between contacts that do not belong to a client social network. For example, manager 102 may identify that contact $208_7$ is associated with contacts $204_{2-4}$ based on, for example, each of their phone numbers having a common area code and prefix, and a suffix within a particular range, e.g., 650-999-(1000-1003), when contacts $204_{2-4}$ email addresses are not available. Such a pattern indicates that each of contacts $208_7$ and $204_{2-4}$ are associated with a similar company, thereby providing a substantive reason for contacts 208 and $204_{2-4}$ to create a client social network within micro-blogging system 100.

There may be certain instances where manager 102 cannot identify a relationship between two or more contacts and/or users, e.g., contact $208_6$. However, manager 102 can subsequently parse database 160 triggered in response to, e.g., new contacts and/or users being added to database 160, in attempt to identify relationships between contact $208_6$ and another contact and/or user.

Advantageously, the techniques described above in conjunction with FIG. 3 enable micro-blogging system 100 to provide purposeful invitation recommendations to users and contacts, which, as a result, may increase the number of users included in micro-blogging system 100.

Figure 4:
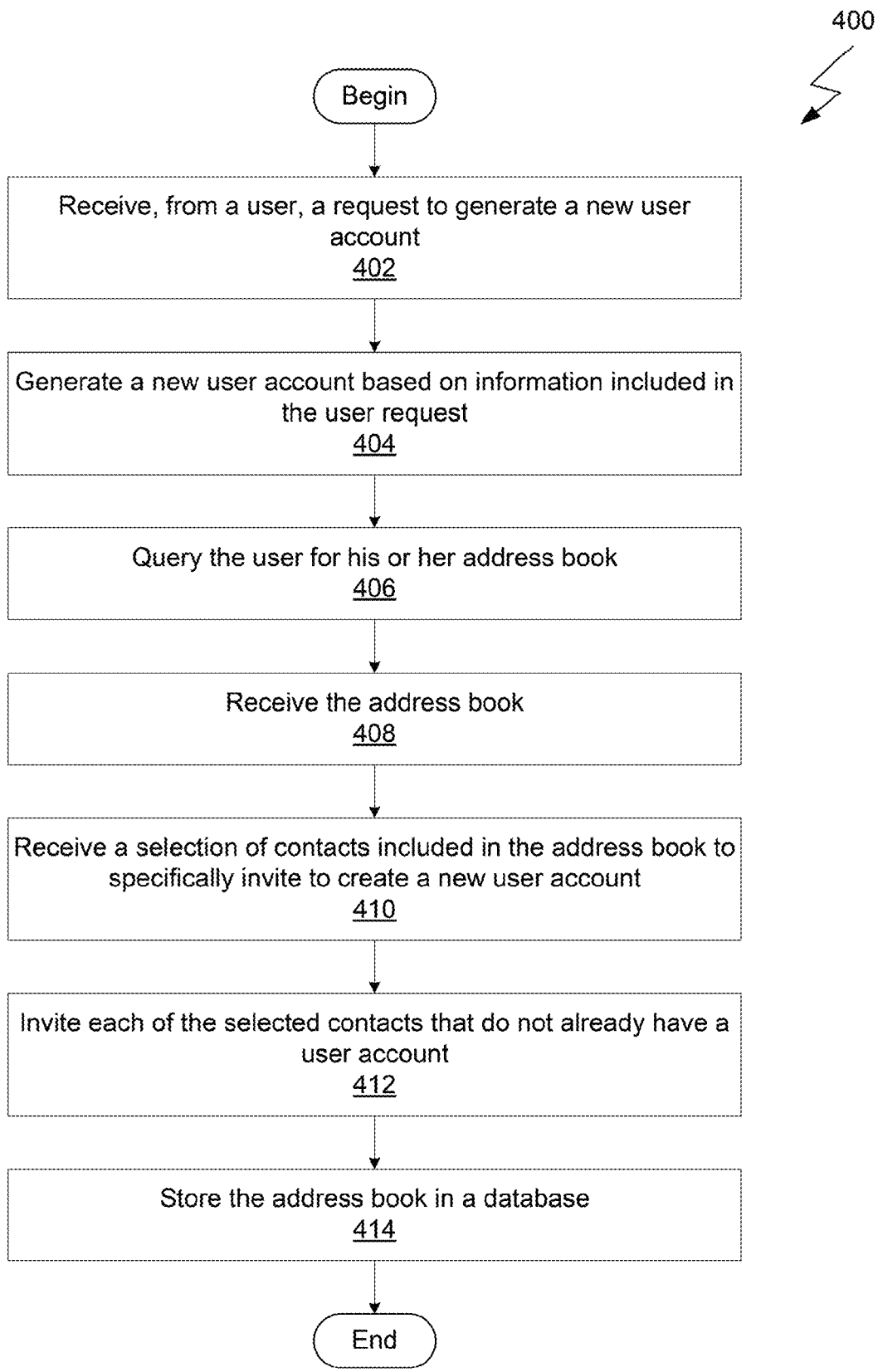
FIG. 4 is a flow diagram of a method of extracting a plurality of contacts associated with a user according to one or more embodiments of the invention.

FIG. 4 is a flow diagram of a method 400 of extracting a plurality of contacts associated with a user according to one or more embodiments of the invention. As shown, method 400 begins at step 402, where manager 102 receives, from a user, a request to generate a new user account. The user may generate such a request by, for example, navigating to a signup webpage hosted by web server 120. At step 404, manager 102 generates a new user account based on information included in the user request. The user request may include, for example, a unique username, an email address and phone number, and the like. At step 406, manager 102 queries the user for permission to access his or her address book. This query may be executed according to a variety of methods including, for example, enabling the user to upload his or her address book.

At step 408, manager 102 receives the address book. At step 410, manager 102 receives a selection of contacts included in the address book to specifically invite to create a new user account. For example, after the user uploads his or her address book, each contact included in the address book may be displayed in a list within the signup webpage, where the user may select or deselect a checkbox associated with the contact to indicate whether he or she wants to invite the contact to join micro-blogging system 100. Each contact included in the address book is automatically uploaded to manager 102, but only the selected contacts are invited to join micro-blogging system 100. At step 412, manager 102 generates and sends out an invitation to each of the selected contacts that do not already have a user account. More specifically, manager 102 parses database 160 to determine whether any of the selected contacts have already registered with micro-blogging system 100 to avoid sending erroneous invitations. The invitations may be customized, for example, based on whether the contact being invited shares an email address associated with a domain for which a client social network already exists. At step 414, manager 102 stores the address book in database 160. In this way, the contacts included in the address book may be subsequently parsed by manager 102 to establish relationships according to the techniques described herein.

Figure 5:
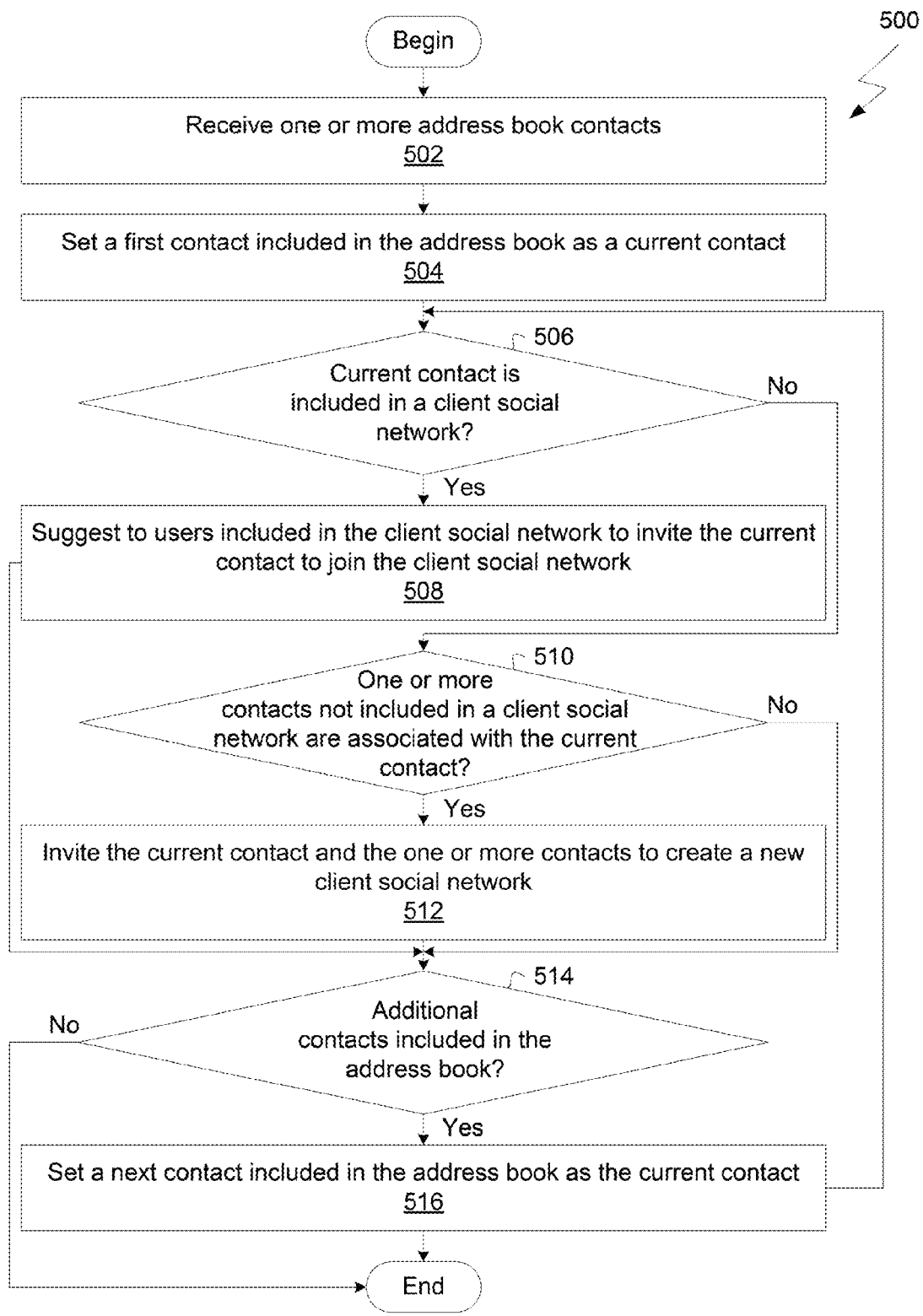
FIG. 5 is a flow diagram of a method of identifying relationships between users and contacts according to or more embodiments of the invention.

FIG. 5 is a flow diagram of a method 500 of identifying relationships between users and contacts according to or more embodiments of the invention. As shown, the method 500 begins at step 502, where manager 102 receives one or more address book contacts gathered according to the method steps 400 described above in conjunction with FIG. 4. At step 504, manager 102 sets a first contact included in the address book as a current contact. At step 506, manager 102 determines whether the current contact is included in a client social network and, if so, the method 500 proceeds to step 508, where manager 102 suggests (e.g., via an invitation interface) to users included in the client social network to invite the current contact to join the client social network. For example, if the current contact has an email address associated with foo.com—a domain for which a client social network is included in micro-blogging system 100—then manager 102 suggests to users included in the foo.com client social network that they invite the current contact to join the client social network. The suggestion may be provided according to various techniques including, for example, displaying a link to the users when they log in to micro-blogging system 100, or by sending them an email.

Referring back now to step 506, if manager 102 determines that the current contact is not included in a client social network, then the method 500 proceeds to step 510. At step 510, manager 102 determines whether one or more contacts not associated with a client social network are associated with the current contact. More specifically, manager 102 parses contacts included in database 160 to identify relationships between contacts who are known to micro-blogging system 100 but are not part of a client social network, such as the relationships 304, 306 and 308 described above in conjunction with FIG. 3. If, at step 510, manager 102 determines that one or more contacts not associated with a client social network are associated with the current contact, then the method 500 proceeds to step 512, where manager 102 collectively invites the current contact and the one or more contacts to create a new client social network.

At step 514, manager 102 determines whether additional contacts are included in the address book and, if so, the method 500 proceeds to step 516, where manager 102 sets a next contact included in the address book as the correct contact. The method steps 506-516 are then repeated for each and every contact included in the address book.

In an alternative embodiment of the present invention, the method described in conjunction with FIG. 5 is executed by collecting the suggestions to invite contacts or to create new client social networks (instead of immediately executing them at steps 508 and 512) and generating the suggestions at periodic intervals.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

What is claimed is:

1. A computer-implemented method of expanding a user base of an online service that manages a plurality of client social networks, comprising:
    examining an address book of a first user of the online service who is registered in a first client social network and identifying a contact in the address book who is not registered in any of the client social networks managed by the online service; and
    generating an invitation interface for a second user of the online service who is registered in a second client social network managed by the online service, the second client social network already existing based on a domain name that is contained in an e-mail address of the identified contact, the invitation interface displaying the identified contact as a person to invite.

2. The method of claim 1, wherein an e-mail address of the second user has the same domain name as the e-mail address of the identified contact.

3. The method of claim 1, further comprising:
    generating an invitation interface for a third user of the online service who is registered in the second client social network that is associated with the domain name that is contained in the e-mail address of the identified contact, the invitation interface displaying the identified contact as a person to invite.

4. The method of claim 1, further comprising:
generating an invitation for the identified contact to create a new client social network.

5. The method of claim 1, further comprising:
identifying a plurality of contacts in the address book who are not registered in any of the client social networks and whose e-mail addresses contain the same domain name, the same domain name not being associated with any of the client social networks; and
generating an invitation to each of the identified contacts to create a new client social network.

6. The method of claim 1, further comprising:
prior to examining the address book of the first user, receiving consent from the first user to examine the address book.

7. A computer-implemented method of expanding a user base of an online service that manages a plurality of client social networks, comprising:
examining address books of users of the online service and identifying only contacts in the address books who are not registered in any of the client social network managed by the online service; and
generating invitation interfaces by which users of the online service can invite the identified contacts to join the client social networks to which the users belong,
wherein the invitation interfaces include a first invitation interface by which a first user of the online service can invite a first one of the identified contacts and a second invitation interface by which a second user of the online service can invite a second one of the identified contacts,
wherein the address book of the first user does not contain contact information of the first one of the identified contacts and the address book of the second user does not contain contact information of the second one of the identified contacts, and
wherein the first and second users belong to different client social networks and each of the different client social networks already existing based on a unique domain name.

8. The method of claim 7, wherein the unique domain name of the client social network to which the first user belongs is the same domain name contained in an e-mail address of the first one of the contacts, and the unique domain name of the client social network to which the second user belongs is the same domain name contained in an e-mail address of the second one of the contacts.

9. The method of claim 7, further comprising:
identifying a plurality of contacts in the address books who are not registered in any of the client social networks and whose e-mail addresses contain the same domain name, the same domain name not being associated with any of the client social networks; and
generating an invitation to each of the identified contacts to a create new client social network.

10. The method of claim 7, further comprising:
prior to examining the address books of the users, receiving consent from the users to examine the address books.

11. The method of claim 7, wherein each of the invitation interfaces is generated to invite at least one of the identified contacts.

12. The method of claim 11, wherein each of the invitation interfaces is generated for one of the users of the online service whose e-mail address domain is the same as the e-mail address domain of the at least one of the identified contacts.

13. A computer-implemented method of expanding a user base of an online service that manages a plurality of client social networks including a first client social network and a second client social network, comprising:
generating an account for a new user in the first client social network;
generating a first invitation interface for the new user;
sending out invitations according to inputs made by the new user in the first invitation interface;
examining address books of existing users of the online service belonging to the second client social network and identifying a contact in the address books who is not registered in any of the client social networks managed by the online service and whose e-mail address domain is the same as that of the new user; and
generating a second invitation interface for the new user by which the new user can invite the identified contact to the first client social network, the first client social network already existing based on the e-mail address domain.

14. The method of claim 13, further comprising:
identifying another contact in the address books who is not registered in any of the client social networks and whose e-mail address domain is the same as that of the new user,
wherein the second invitation interface is generated so that the new user can invite one or more identified contacts.

15. The method of claim 13, further comprising:
prior to examining the address book of the existing users, receiving consent from the existing users to examine the address books.

16. The method of claim 13, further comprising:
prior to generating the first invitation interface for the new user, examining an address book of the new user.

17. The method of claim 16, further comprising:
examining the address book of the new user and identifying a contact in the address book of the new user who is not registered in any of the client social networks; and
generating a third invitation interface for one or more users of the online service whose e-mail address domain is the same as that of the identified contact.

18. The method of claim 16, further comprising:
examining the address book of the new user and identifying a contact in the address book of the new user who is not registered in any of the client social networks and whose e-mail address contains a domain name not associated with any of the client social networks; and
generating an invitation for the identified contact to create a new client social network.

* * * * *